(12) United States Patent
Harbers et al.

(10) Patent No.: US 9,835,295 B2
(45) Date of Patent: *Dec. 5, 2017

(54) EFFICIENT LED-BASED ILLUMINATION MODULES WITH HIGH COLOR RENDERING INDEX

(71) Applicant: Xicato, Inc., San Jose, CA (US)

(72) Inventors: Gerard Harbers, Sunnyvale, CA (US); Raghuram L. V. Petluri, Cerritos, CA (US)

(73) Assignee: Xicato, Inc., San Jose, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/752,686

(22) Filed: Jun. 26, 2015

(65) Prior Publication Data

US 2015/0316218 A1    Nov. 5, 2015

Related U.S. Application Data

(63) Continuation of application No. 13/854,663, filed on Apr. 1, 2013, now Pat. No. 9,068,702, which is a
(Continued)

(51) Int. Cl.
*F21K 99/00* (2016.01)
*C09K 11/77* (2006.01)
(Continued)

(52) U.S. Cl.
CPC ............ *F21K 9/50* (2013.01); *C09K 11/7734* (2013.01); *C09K 11/7774* (2013.01); *F21K 9/62* (2016.08);
(Continued)

(58) Field of Classification Search
CPC ..... F21K 9/50; F21K 9/62; F21K 9/64; C09K 11/7734; C09K 11/7774; F21Y 2103/33; F21Y 2115/10; F21V 7/22; Y10S 362/80
(Continued)

(56) References Cited

U.S. PATENT DOCUMENTS 3,593,055 A    7/1971 Geusic et al.
5,959,316 A    9/1999 Lowery
(Continued)

FOREIGN PATENT DOCUMENTS

CN    101124682 A    2/2008
CN    101231244 A    7/2008
(Continued)

OTHER PUBLICATIONS

Machine translation in English of JP2008-218998, 20 pages.
(Continued)

*Primary Examiner* — Laura Tso
(74) *Attorney, Agent, or Firm* — Silicon Valley Patent Group LLP (57) ABSTRACT

An illumination module includes a light mixing cavity with an interior surface area and window that are physically separated from an LED. A portion of the window is coated with a first wavelength converting material and a portion of the interior surface area is coated with a second wavelength converting material. The window may be coated with LuAG:Ce. The window may also be coated with a third wavelength converting material with a peak emission wavelength between 615-655 nm where the spectral response of light emitted from the window is within 20% of a blackbody radiator at the same CCT. The LED may emit a light that is converted by the light mixing cavity with a color conversion efficiency ratio greater than 130 lm/W where the light mixing cavity includes two photo-luminescent materials with a peak emission wavelengths between 508-528 nm and 615-655 nm.

18 Claims, 8 Drawing Sheets

Related U.S. Application Data continuation of application No. 13/343,644, filed on Jan. 4, 2012, now Pat. No. 8,408,726, which is a continuation of application No. 12/717,880, filed on Mar. 4, 2010, now Pat. No. 8,104,908.

(51) Int. Cl.
  *F21K 9/62* (2016.01)
  *F21K 9/64* (2016.01)
  *F21Y 103/33* (2016.01)
  *F21Y 115/10* (2016.01)
  *F21V 7/22* (2006.01)

(52) U.S. Cl.
  CPC .................. *F21K 9/64* (2016.08); *F21V 7/22* (2013.01); *F21Y 2103/33* (2016.08); *F21Y 2115/10* (2016.08); *Y10S 362/80* (2013.01)

(58) Field of Classification Search
  USPC .......................... 362/84, 362, 800
  See application file for complete search history.

(56) References Cited

U.S. PATENT DOCUMENTS

| | | | |
|---|---|---|---|
| 5,962,971 A | 10/1999 | Chen | |
| 5,966,393 A | 10/1999 | Hide et al. | |
| 5,982,092 A | 11/1999 | Chen | |
| 5,998,925 A | 12/1999 | Shimizu et al. | |
| 6,066,861 A | 5/2000 | Hohn et al. | |
| 6,068,383 A | 5/2000 | Robertson et al. | |
| 6,220,725 B1 | 4/2001 | Arnold | |
| 6,234,648 B1 | 5/2001 | Borner et al. | |
| 6,252,254 B1 | 6/2001 | Soules et al. | |
| 6,255,670 B1 | 7/2001 | Srivastava et al. | |
| 6,340,824 B1 | 1/2002 | Komoto et al. | |
| 6,351,069 B1 | 2/2002 | Lowery et al. | |
| 6,469,322 B1 | 10/2002 | Srivastava et al. | |
| 6,504,301 B1 | 1/2003 | Lowery et al. | |
| 6,576,930 B2 | 6/2003 | Reeh et al. | |
| 6,586,882 B1 | 7/2003 | Harbers | |
| 6,600,175 B1 | 7/2003 | Baretz et al. | |
| 6,621,211 B1 | 9/2003 | Srivastava et al. | |
| 6,649,946 B2 | 11/2003 | Bogner et al. | |
| 6,680,569 B2 | 1/2004 | Mueller-Mach et al. | |
| 6,724,142 B2 | 4/2004 | Ellens et al. | |
| 6,765,237 B1 | 7/2004 | Doxsee et al. | |
| 6,791,259 B1 | 9/2004 | Stokes et al. | |
| 6,812,500 B2 | 11/2004 | Reeh et al. | |
| 6,850,002 B2 | 2/2005 | Danielson et al. | |
| 7,126,162 B2 | 10/2006 | Reeh et al. | |
| 7,250,715 B2 | 7/2007 | Mueller et al. | |
| 7,350,933 B2 | 4/2008 | Ng et al. | |
| 7,453,195 B2 | 11/2008 | Radkov | |
| 7,479,662 B2 | 1/2009 | Soules et al. | |
| 7,494,246 B2 | 2/2009 | Harbers | |
| 7,534,002 B2 | 5/2009 | Yamaguchi et al. | |
| 7,564,180 B2 | 7/2009 | Brandes | |
| 7,614,759 B2 | 11/2009 | Negley | |
| 7,629,621 B2 | 12/2009 | Reeh et al. | |
| 7,906,790 B2 | 3/2011 | Radkov et al. | |
| 8,104,908 B2 * | 1/2012 | Harbers ............ F21K 9/50 362/800 |
| 8,172,415 B2 | 5/2012 | Wegh et al. | |
| 8,220,971 B2 | 7/2012 | Harbers et al. | |
| 8,408,726 B2 * | 4/2013 | Harbers ............ F21K 9/50 362/800 |
| 8,523,924 B2 | 9/2013 | Meyer et al. | |
| 8,636,378 B2 | 1/2014 | Harbers et al. | |
| 9,068,702 B2 * | 6/2015 | Harbers ............ F21K 9/50 |
| 2002/0043926 A1 | 4/2002 | Takahashi et al. | |
| 2004/0041220 A1 | 3/2004 | Kwak et al. | |
| 2005/0057145 A1 | 3/2005 | Shieh et al. | |
| 2006/0087487 A1 | 4/2006 | Ota | |
| 2007/0081336 A1 | 4/2007 | Bierhuizen et al. | |
| 2007/0235751 A1 | 10/2007 | Radkov et al. | |
| 2007/0241657 A1 | 10/2007 | Radkov et al. | |
| 2007/0263393 A1 * | 11/2007 | Van De Ven ....... F21V 29/2212 362/362 |
| 2008/0142816 A1 | 6/2008 | Bierhuizen et al. | |
| 2008/0315228 A1 | 12/2008 | Krames et al. | |
| 2009/0103293 A1 | 4/2009 | Harbers et al. | |
| 2009/0103296 A1 * | 4/2009 | Harbers ............ F21V 7/22 362/234 |
| 2009/0284965 A1 | 11/2009 | Zheng et al. | |
| 2010/0118510 A1 | 5/2010 | Bailey et al. | |
| 2012/0112626 A1 | 5/2012 | Sakuta et al. | |

FOREIGN PATENT DOCUMENTS

| | | |
|---|---|---|
| DE | 10 2007 037875 A1 | 2/2009 |
| EP | 0 890 996 A2 | 1/1999 |
| EP | 1566426 A2 | 8/2005 |
| JP | 2003-517705 | 5/2003 |
| JP | 2005-303289 A | 10/2005 |
| JP | 2007-214579 A | 8/2007 |
| JP | 2007-294754 A | 11/2007 |
| JP | 2008-218998 | 9/2008 |
| JP | 2010-528415 A | 8/2010 |
| JP | 2012-056970 A | 3/2012 |
| KR | 2009-027695 | 3/2009 |
| TW | 200930937 A | 7/2009 |
| WO | WO01/36864 A2 | 5/2001 |
| WO | WO 2007/080555 A1 | 7/2007 |
| WO | WO 2008/149250 A1 | 12/2008 |
| WO | WO 2009/093163 A2 | 7/2009 |
| WO | WO 2009/107052 A1 | 9/2009 |

OTHER PUBLICATIONS

Machine Translation of Abstract for CN 101231244 in English, visited at www.espacenet.com on Jun. 27, 2013, 2 pages.
Machine Translation of Abstract for DE 10 2007 037875 in English, from the European Patent Office at http://translation.portal.epo.org/emtp/translate/?TREN=en%3Agoogle&SRCLANG=de&UID=Ad102007037875xA1xDExops.epo.org, visited on Jun. 13, 2011, 1 page.
English Translation for JP 2007-294754, 19 pages.
International Search Report and Written Opinion for International Application No. PCT/US2011/024395 dated Apr. 24, 2011, 13 pages.
International Preliminary Report on Patentability for International Application No. PCT/US2011/024395 dated Sep. 13, 2012, 10 pages.
Preliminary Amendment dated Aug. 12, 2011 for U.S. Appl. No. 12/717,880, filed Mar. 4, 2010, 14 pages.
Notice of Allowance by Examiner Tso dated Dec. 6, 2011 for U.S. Appl. No. 12/717,880, filed Mar. 4, 2010, 13 pages.
Amendment after Notice of Allowance dated Dec. 9, 2011 for U.S. Appl. No. 12/717,880, filed Mar. 4, 2010, 9 pages.
Amendment After Final initialed by Examiner Tso dated Dec. 20, 2011 for U.S. Appl. No. 12/717,880, filed Mar. 4, 2010, 3 pages.
Notice of Allowance by Examiner Tso dated Dec. 29, 2011 for U.S. Appl. No. 12/717,880, filed Mar. 4, 2010, 3 pages.
Notice of Allowance by Examiner Tso dated Dec. 6, 2012 for U.S. Appl. No. 13/343,644, filed Jan. 4, 2012, 17 pages.
Office Action by Examiner Tso dated Nov. 5, 2014 for U.S. Appl. No. 13/854,663, filed Apr. 1, 2013, 10 pages.
Response to Office Action dated Feb. 5, 2015 for U.S. Appl. No. 13/854,663, filed Apr. 1, 2013, 7 pages.
Notice of Allowance by Examiner Tso dated Feb. 26, 2015 for U.S. Appl. No. 13/854,663, filed Apr. 1, 2013, 8 pages.

* cited by examiner

| | REFERENCE MODULE | HIGH CRI MODULE |
|---|---|---|
| RA | 84 | 97 |
| R1 | 85 | 96 |
| R2 | 89 | 98 |
| R3 | 91 | 98 |
| R4 | 86 | 96 |
| R5 | 83 | 96 |
| R6 | 85 | 95 |
| R7 | 88 | 98 |
| R8 | 69 | 98 |
| R9 | 27 | 97 |
| R10 | 72 | 97 |
| R11 | 85 | 94 |
| R12 | 66 | 90 |
| R13 | 85 | 96 |
| R14 | 94 | 98 |
| R15 | 79 | 98 |

| | REFERENCE MODULE | HIGH CRI MODULE |
|---|---|---|
| RA | 81 | 98 |
| R1 | 80 | 98 |
| R2 | 85 | 99 |
| R3 | 89 | 98 |
| R4 | 81 | 98 |
| R5 | 78 | 98 |
| R6 | 80 | 97 |
| R7 | 86 | 98 |
| R8 | 66 | 98 |
| R9 | 16 | 98 |
| R10 | 64 | 99 |
| R11 | 79 | 98 |
| R12 | 58 | 88 |
| R13 | 81 | 98 |
| R14 | 93 | 98 |
| R15 | 75 | 98 |

| | REFERENCE MODULE | HIGH CRI MODULE |
|---|---|---|
| RA | 84 | 97 |
| R1 | 83 | 98 |
| R2 | 89 | 99 |
| R3 | 92 | 99 |
| R4 | 83 | 94 |
| R5 | 82 | 96 |
| R6 | 83 | 97 |
| R7 | 89 | 95 |
| R8 | 70 | 95 |
| R9 | 22 | 90 |
| R10 | 71 | 99 |
| R11 | 79 | 95 |
| R12 | 63 | 78 |
| R13 | 84 | 99 |
| R14 | 95 | 99 |
| R15 | 79 | 96 |

FIG. 9B

MAXIMUM PERCENTAGE DEVIATION OF
MEASURED SPECTRA FROM BLACKBODY CURVE

| | | 2700K REF MODULE | 2700K HIGH CRI MODULE | 3000K REF MODULE | 3000K HIGH CRI MODULE | 4000K REF MODULE | 4000K HIGH CRI MODULE |
|---|---|---|---|---|---|---|---|
| WAVELENGTH RANGES [NM] | 450-475 | 73 | 41 | 65 | 60 | 63 | 44 |
| | 475-500 | 67 | 9 | 66 | 18 | 69 | 20 |
| | 500-525 | 48 | 5 | 49 | 9 | 57 | 18 |
| | 525-550 | 13 | 2 | 16 | 1 | 5 | 7 |
| | 550-575 | 7 | 10 | 14 | 8 | 5 | 6 |
| | 575-600 | 14 | 12 | 16 | 10 | 6 | 7 |
| | 600-625 | 15 | 8 | 14 | 7 | 15 | 5 |
| | 625-650 | 36 | 14 | 39 | 12 | 43 | 9 |
| | 650-675 | 65 | 41 | 66 | 39 | 66 | 34 |
| | 675-700 | 82 | 67 | 83 | 64 | 81 | 59 |
| | 700-725 | 92 | 84 | 91 | 82 | 90 | 78 |
| | 725-750 | 96 | 92 | 96 | 91 | 95 | 89 |

FIG. 10

|  | 3 PHOSPHOR CAVITY | | 2 PHOSPHOR CAVITY | |
| --- | --- | --- | --- | --- |
| TARGET CCT | FLUX OUTPUT (LUMENS) | LUMENS/W RATIO | FLUX OUTPUT (LUMENS) | LUMENS/W RATIO |
| 3000K | 1290 | 141 | 1216 | 136 |
| 4000K | 1413 | 158 | 1303 | 146 |

FIG. 11

|  |  | RED 618 CAVITY | |
| --- | --- | --- | --- |
|  | TARGET CCT | FLUX OUTPUT (LUMENS) | LUMENS/W RATIO |
| 10 LED BOARD | 3000K | 1290 | 141 |
|  | 4000K | 1413 | 158 |
| 7 LED BOARD | 3000K | 923 | 147 |
|  | 4000K | 1005 | 160 |
| 4 LED BOARD | 3000K | 553 | 154 |
|  | 4000K | 555 | 155 |

FIG. 12A

|  |  | RED 630 CAVITY | |
| --- | --- | --- | --- |
|  | TARGET CCT | FLUX OUTPUT (LUMENS) | LUMENS/W RATIO |
| 10 LED BOARD | 3000K | 1255 | 140 |
|  | 4000K | 1372 | 153 |
| 7 LED BOARD | 3000K | 849 | 135 |
|  | 4000K | 965 | 154 |
| 4 LED BOARD | 3000K | 478 | 134 |
|  | 4000K | 508 | 142 |

FIG. 12B

EFFICIENT LED-BASED ILLUMINATION MODULES WITH HIGH COLOR RENDERING INDEX

CROSS REFERENCE TO RELATED APPLICATIONS

This application is a continuation of U.S. application Ser. No. 13/854,663, filed Apr. 1, 2013, which is a continuation of U.S. application Ser. No. 13/343,644, filed Jan. 4, 2012, now U.S. Pat. No. 8,408,726, issued Apr. 2, 2013, which is a continuation of U.S. application Ser. No. 12/717,880, filed Mar. 4, 2010, now U.S. Pat. No. 8,104,908, issued Jan. 31, 2012, all of which are incorporated by reference herein in their entireties.

TECHNICAL FIELD

The described embodiments relate to illumination modules that include Light Emitting Diodes (LEDs).

BACKGROUND INFORMATION

Color rendering index (CRI) is a quantitative measure of the ability of a light source to reproduce the colors of various objects faithfully in comparison with an ideal or natural light source. The CRI system is administered by the International Commission on Illumination (CIE). The CIE selected fifteen test color samples to grade the color properties of a white light source. The first eight test color samples are relatively low saturated colors and are evenly distributed over the complete range of hues. These eight samples are employed to calculate the general color rendering index $R_a$. The general color rendering index $R_a$ is simply calculated as the average of the first eight color rendering index values, $R_1$-$R_8$. An additional seven samples provide supplementary information about the color rendering properties of the light source; the first four focus on high saturation, and the last three are representative of well-known objects.

A set of color rendering index values, R1-R15, can be calculated for a particular correlated color temperature (CCT) by comparing the spectral response of a light source against that of each test color sample, respectively. The calculation consists of taking the differences $\Delta E_j$, between the spectral power distribution of a test color sample and the spectral power distribution of the light source under test at any number of equally spaced wavelengths over the range of wavelengths under test. Based on these differences, each specific color rendering index value is calculated as follows:

$$R_i = \sum_{j=1}^{N} \frac{100 - 4.6\Delta E_j}{N} \quad (1)$$

The test color samples associated with the various CRI indices are designed such that certain ideal or natural light sources should achieve a CRI value of 100 for each index. For example, below 5,000 Kelvin, the blackbody radiator is taken as the ideal light source. Thus, a blackbody radiator below 5,000 Kelvin has a CRI of 100 for each specific CRI value. Incandescent lamps have a CRI rating approaching 100 as they can be constructed to be a very close approximation of a blackbody radiator. Light sources of limited spectral power distribution, such as arc lamps or light emitting diodes (LEDs) typically exhibit very low CRI values. In general, illumination sources achieving high CRI values are desirable as they offer brilliant color rendering of objects colored across the visible spectrum. A light source that incorporates LEDs and has high CRI values is desired.

SUMMARY

An illumination module includes a light mixing cavity with an interior surface area that is physically separated from at least one Light Emitting Diode (LED) and is configured to direct light emitted from the LED to an output window, which is also physically separated from the LED and is disposed above the LED. A portion of the window is coated with a first wavelength converting material and a portion of the interior surface area is coated with a second wavelength converting material. The wavelength converting material on the output window may include Lutetium Aluminum Garnet doped with Cerium (LuAG:Ce). The wavelength converting material on the output window may also include a wavelength converting material with a peak emission wavelength between 615 and 655 nanometers where the spectral response of light emitted from the output window is within 20% and more specifically, 15% of a blackbody radiator at the same CCT, measured as max((test($\lambda$)−Blackbody($\lambda$))/Blackbody($\lambda$)) for $\lambda$=500 nm to $\lambda$=650 nm. The LED may emit a first colored light that is converted by the light mixing cavity to a second color light with a color conversion efficiency ratio greater than 130 lm/W, measured as luminous flux out of the module divided by radiometric output power of the LEDs, where the light mixing cavity includes a first photo-luminescent material with a peak emission wavelengths between 508 and 528 nanometers and a second photo-luminescent material with a peak emission wavelength between 615 and 655 nanometers.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
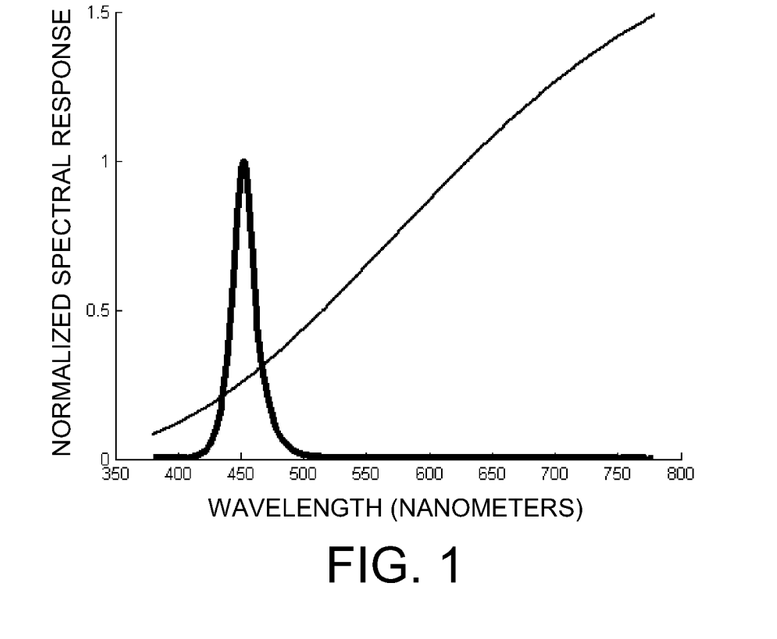
FIG. 1 illustrates the spectral response of a blackbody radiator with a correlated color temperature (CCT) of 3,000 Kelvin and the spectral response of an exemplary LED with a peak emission near 450 nanometers.

FIG. 1 illustrates the spectral response of a blackbody radiator with a correlated color temperature (CCT) of 3,000 Kelvin. As discussed above, below 5,000 Kelvin, the various CRI index values are designed to be 100 for a blackbody radiator. Thus, an approach to the design of an illumination module that exhibits high CRI values at a CCT below 5,000 Kelvin is to design the module to emit light with a spectral power distribution that closely matches that of a blackbody radiator over the wavelength range of interest, e.g. the visible spectrum. FIG. 1 also illustrates the spectral response of an exemplary LED with a peak emission near 450 nanometers. LEDs with a peak emission between 380 and 490 nanometers may be selected as the source of light in an LED-based illumination module because of the radiometric efficiency of LEDs in this peak wavelength regime. However, as illustrated in FIG. 1, the spectral response of the LED is very narrow, varies greatly from the spectral response of a blackbody radiator, and suffers from a very low CRI.

Figure 2:
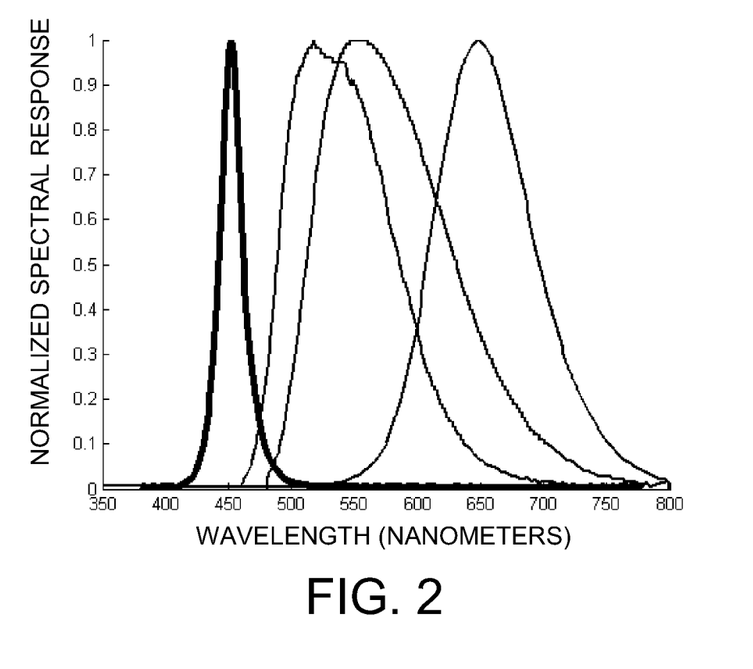
FIG. 2 illustrates the emission spectra of an LED and several photo-luminescent materials.

To achieve light output with high CRI values from an LED-based illumination module, a portion of the narrow band emission of the LED is converted to various higher wavelengths to more closely emulate the spectral response of a blackbody radiator. FIG. 2 illustrates the emission spectra of an LED and several photo-luminescent materials, which when combined as described in this patent document, closely match the spectral response of a blackbody radiator at 3,000 Kelvin. Each of the exemplary photo-luminescent materials has a unique chemical composition, such as a particular phosphor. Although different phosphors may be blended, for purposes of this patent document, a photo-luminescent material is only one distinct chemical compound, not a blend. Example phosphors that may used to obtain efficient illumination modules with high CRI values for each of the CRI indices R1-R15 include phosphors such as $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3$Cl:Eu, $Ba_5(PO_4)_3$Cl:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce.

FIG. 2 illustrates the spectral response of a red emitting $CaAlSiN_3$:Eu phosphor manufactured by Mitsubishi Chemical Corporation (Japan), which is designed to exhibit a peak emission at approximately 650 nanometers. FIG. 2 also illustrates the emission spectra of a LuAG:Ce phosphor manufactured by Merck (Germany), which is designed to exhibit a peak emission at approximately 518 nanometers. FIG. 2 also illustrates the emission spectra of a $Y_3Al_5O_{12}$:Ce (YAG) phosphor manufactured by Phosphor Technology Ltd. (England), which is designed to exhibit a peak emission at approximately 555 nanometers. These specific phosphors are exemplary and many other phosphor compositions could also or alternatively be employed. In the present example, these phosphors are selected for temperature stability, long term reliability, and durability in the face of environmental conditions present in various lighting environments. To obtain efficient illumination modules with high CRI values for each of the CRI indices R1-R15, a red emitting phosphor with a peak emission wavelength between 618 and 655 nanometers may be employed. To compensate for a deficiency in spectral response in the wavelength range between 460 and 525 nanometers created by the use of the red emitting phosphor, a green emitting phosphor with a peak emission wavelength between 508 and 528 nanometers may be employed. In this way it is possible to obtain an illumination module with a spectral response that is within 20% of an emission spectrum of a blackbody radiator in the wavelength range between 500 and 650 nanometers. In other examples, it is possible to obtain an illumination module with a spectral response that is within 15% of an emission spectrum of a blackbody radiator in the wavelength range between 500 and 650 nanometers. In other examples, it is possible to obtain an illumination module with a spectral response that is within 10% of an emission spectrum of a blackbody radiator in the wavelength range between 500 and 650 nanometers. Furthermore, illumination modules constructed in this manner may exhibit color conversion efficiency ratios greater than 130 lm/W, as discussed below. In addition, a yellow emitting phosphor with a peak emission in the wavelength range between 545 and 565 nanometers may be employed. In some examples, the green emitting phosphor, the red emitting phosphor, and the yellow emitting phosphor are mixed in proportion by weight between 55 and 90 parts green phosphor, between 5 and 25 parts red phosphor, and between 5 and 35 parts yellow phosphor to obtain high efficiency, high CRI illumination modules. In general, at least three photo-luminescent materials are selected such that each of their peak emission wavelengths are at least thirty five nanometers apart from one another and no more than one hundred and fifty nanometers from one another. For example, at least three phosphors with peak emission wavelengths spaced between 505 nanometers and 655 nanometers are employed to convert portions of light emitted from an LED to produce color converted light with high CRI values. By selecting three phosphors with peak emission wavelengths spaced in this manner, the color converted light more closely approximates the spectral response of a blackbody radiator.

Figure 3:
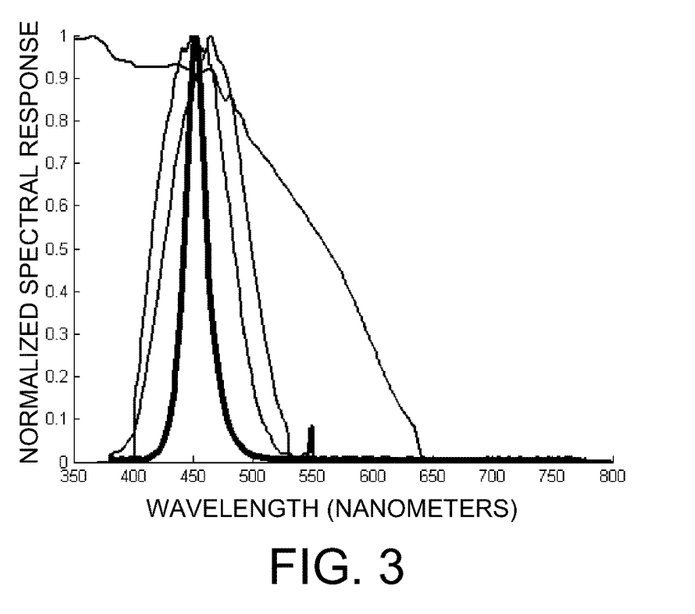
FIG. 3 illustrates the emission spectra of an LED and the excitation spectra of the three phosphors discussed with respect to FIG. 2.

In addition to achieving color conversion with high CRI values, doing so with high efficiency is also desirable. Selection of phosphors with excitation spectra that closely match the emission spectrum of the LED improves color conversion efficiency. FIG. 3 illustrates the excitation spectra of the three phosphors discussed with respect to FIG. 2. The emission spectrum of the exemplary royal blue LED falls within the excitation spectra of the LuAG and YAG phosphors. In other words, these phosphors efficiently convert royal blue light. If the excitation source were a red light, each of these phosphors would exhibit very little response, thus color conversion efficiency would be very low. In one example, at least two phosphors are selected with peak values of their excitation spectra within one hundred nanometers of the peak value of the emission spectra of the light emitted from the LEDs of the LED-based illumination module. In another example, at least two phosphors are selected with peak values of their excitation spectra within fifty nanometers of the peak value of the emission spectra of the light emitted from the LEDs of the LED-based illumination module.

Figure 4:
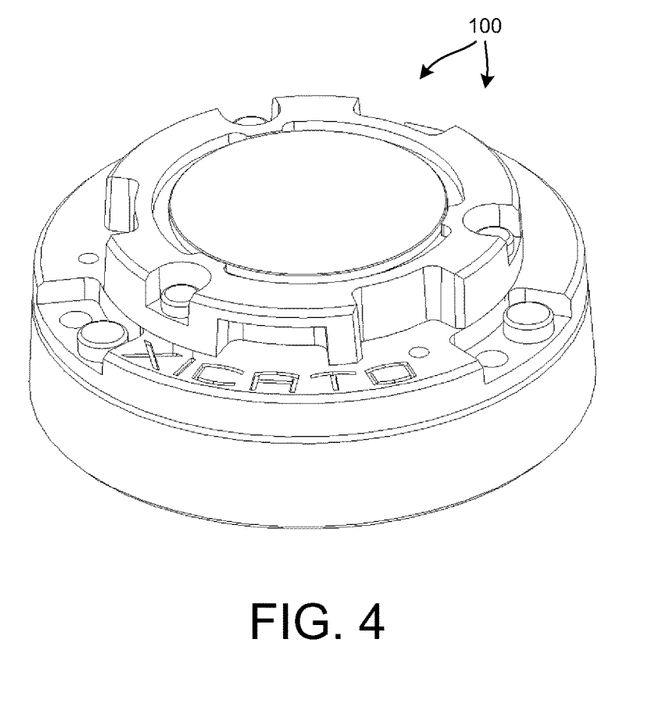
FIG. 4 illustrates a perspective view of an embodiment of a light emitting diode (LED) illumination device.
Figure 5:
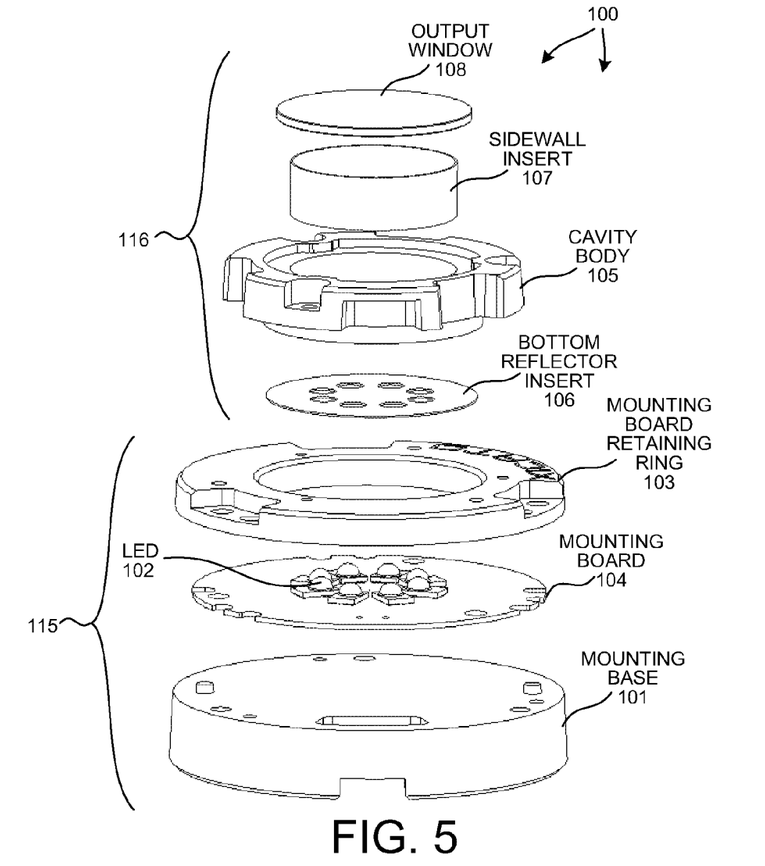
FIG. 5 shows an exploded view illustrating components of LED illumination device.
Figure 6:
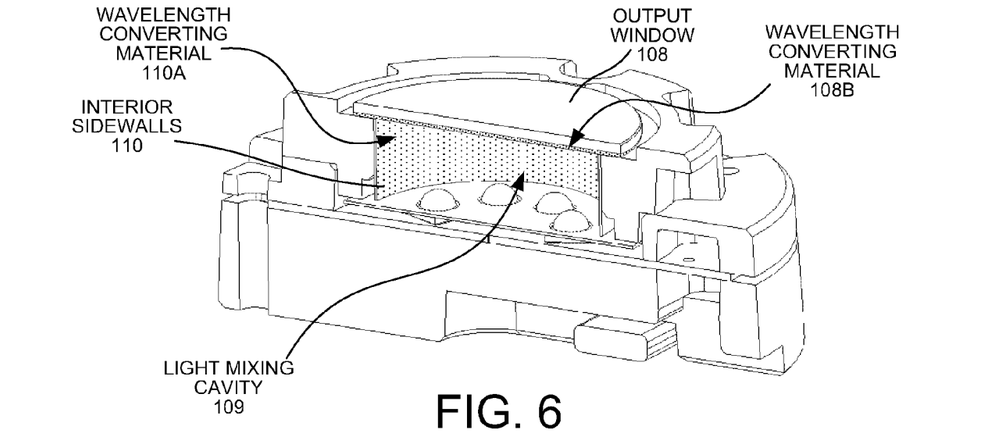
FIG. 6 illustrates a perspective, cross-sectional view of an embodiment of the LED illumination device.

FIG. 4 illustrates a perspective view of an embodiment of a light emitting diode (LED) illumination device 100. The illumination module 100 may be used, e.g., as a shelf lighting module, a street lighting module, a wall wash lighting module, an accent lighting module, an orientation lighting module or any other desired lighting module. FIG. 5 shows an exploded view illustrating components of LED illumination device 100. It should be understood that as defined herein an LED illumination device is not an LED, but is an LED light source or fixture or component part of an LED light source or fixture. LED illumination device 100 includes one or more LED die or packaged LEDs and a mounting board to which LED die or packaged LEDs are attached. FIG. 6 illustrates a perspective, cross-sectional view of an embodiment of the LED illumination device 100.

Referring to FIG. 5, LED illumination device 100 includes one or more solid state light emitting elements, such as light emitting diodes (LEDs) 102 mounted on mounting board 104. Mounting board 104 is attached to mounting base 101 and secured in position by mounting board retaining ring 103, e.g. using suitable fasteners, fastening features, or fastening adhesives. Together, mounting board 104 populated by LEDs 102 and mounting board retaining ring 103 comprise light source sub-assembly 115. Light source sub-assembly 115 is operable to convert electrical energy into light using LEDs 102.

LED illumination device 100 may also include a light conversion sub-assembly 116, which may include a cavity body 105 and output window 108, and optionally includes bottom reflector insert 106 that may be placed over the mounting board 104 and sidewall insert 107 that may be placed inside cavity body 105. Output window 108 may be manufactured from an acrylic material that includes scattering particles, e.g., made from TiO2, ZnO, or BaSO4, or from AlO2, either in crystalline form (Sapphire) or on ceramic form (Alumina), or other material that have low absorption over the full visible spectrum. Output window 108 is fixed to the top of cavity body 105. Cavity body 105 or the sidewall insert 107, if used, includes interior sidewalls 110, illustrated in FIG. 6. The interior sidewalls 110 should be highly reflective, which may be achieved, e.g., by polishing the interior of cavity body 105, which may be aluminum, or using a reflective coating containing titanium dioxide (TiO2), zinc oxide (ZnO), and barium sulfate (BaSO4) particles, or a combination of these materials. Where the sidewall insert 107 is used, the high reflectively of the interior sidewalls 110 may be achieved by manufacturing the sidewall insert from a reflective material such as Miro®, produced by Alanod, a German company. The bottom reflector insert 106, if used, may similarly be manufactured from Miro®, produced by Alanod.

When cavity body 105 is mounted over light source sub-assembly 115, the interior sidewalls 110 of the cavity body 105 (or sidewall insert 107, if used), the top of mounting board 104 (or bottom reflector insert 106, if used), and output window 108 enclose a volume that defines a primary light mixing cavity 109 in the LED illumination device 100, illustrated in FIG. 6. Within the light mixing cavity 109 a portion of light from the LEDs 102 is reflected until it exits through output window 108. The bottom reflector insert 106, which may optionally be placed over mounting board 104, includes holes such that the light emitting portion of each LED 102 is not blocked by bottom reflector insert 106.

For purposes of performing color conversion, the light emitted from light source sub-assembly 115 is directed to the light mixing cavity 109 for color conversion and color mixing. In one embodiment, light conversion sub-assembly 116 includes multiple wavelength converting materials coating at least a portion of one or more of the interior sidewalls 110, output window 108 and the top of mounting board 104 (or bottom reflector insert 106, if used). For purposes of this patent document, a wavelength converting material is any single chemical compound or mixture of different chemical compounds that performs a color conversion function, e.g. absorbs light of one peak wavelength and emits light at another peak wavelength. By way of example, portions of the interior sidewalls 110 of the sidewall insert 107 may be coated with one or more wavelength converting materials 110A, while portions of output window 108 may be coated with one or more different wavelength converting materials 108B, as illustrated in FIG. 6. If desired, wavelength converting materials 110A and 108B may include than one type of wavelength converting materials, which may be blended together, layered over each other, or applied in distinct areas, or any combination of the foregoing. If desired, scattering particles, such as such as TiO2, ZnO, and/or BaSO4 particles, may be mixed into the wavelength converting material layers.

Reflecting the light within the cavity 109 prior to exiting the output window 108 has the effect of mixing the light and providing a more uniform distribution of the light that is emitted from the LED illumination device 100. Thus, the photo converting properties of the wavelength converting materials in combination with the mixing of light within cavity 109 results in a uniformly distributed color converted light output by output window 108. By tuning the chemical properties of the wavelength converting materials and the geometric properties of the coatings on the interior surfaces of cavity 109, specific color properties of light output by output window 108 may be specified, e.g. color point, color temperature, and color rendering index (CRI).

In this embodiment, the LEDs 102 may all emit light of different peak emission wavelengths within the UV to blue range. When used in combination with phosphors (or other wavelength conversion means), which may be, e.g., in or on the output window 108, applied to the sidewalls of cavity 109, applied to the top of mounting board 104 (or bottom reflector insert 106, if used) or applied to other components placed inside the cavity (not shown), the output light of the illumination device 100 has the desired color with high CRI values. The adjustment of color point of the illumination device may be accomplished by replacing sidewall insert 107 and/or the output window 108, which similarly may be coated or impregnated with one or more wavelength converting materials. Adjustment of color point may be achieved by choosing the shape and height of the sidewalls that define the cavity, selecting which of the parts in the cavity will be covered with phosphor or not, and by optimization of the thickness or density of the phosphors.

In a first example, the performance of two illumination modules 100 with a target CCT of 2700 Kelvin are compared. A reference illumination module includes 9 LEDs selected to emit in the royal blue range between 440 and 460 nanometers and one LED selected to emit in the blue range between 460 and 490 nanometers. A red emitting (SrCa)AlSiN$_3$:Eu phosphor with a peak emission at approximately 630 nanometers covers a portion of sidewall insert 107. The phosphor is mixed in a binder of silicone in a proportion in the range of 2-6% by volume, uniformly applied to sidewall insert 107 at a thickness in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a yellow emitting Y$_3$Al$_5$O$_{12}$:Ce phosphor is then mixed in a binder of silicone in a proportion in the range of 50-80% by volume, uniformly applied to output window 108 at a thickness in the range of 90-130 micrometers, and cured. In one example, the phosphor is mixed in a binder of silicone in a proportion of approximately 70% by volume, uniformly applied to sidewall insert 107 at a thickness of approximately 110 micrometers, and cured. Optionally, some amount of red emitting (SrCa)AlSiN$_3$:Eu phosphor may also be mixed with the yellow emitting Y$_3$Al$_5$O$_{12}$:Ce phosphor.

A high CRI illumination module includes 7 LEDs selected to emit in the royal blue range between 440 and 460 nanometers and three LEDs selected to emit in the blue range between 460 and 490 nanometers. A red emitting (SrCa)AlSiN$_3$:Eu phosphor with a peak emission at approximately 650 nanometers covers a portion of sidewall insert 107. The phosphor is mixed in a binder of silicone in a proportion in the range of 2-6% by volume, uniformly applied to sidewall insert 107 at a thickness of in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a mixture of phosphors in the ranges of approximately 10-25 parts YAG, 5-15 parts (SrCa)AlSiN$_3$:Eu, and 60-80 parts LuAG:Ce by weight is assembled. Environmental conditions and the condition of each phosphor affects the results obtained for any particular combination of phosphors. In one example, a mixture of phosphors including approximately 17 parts YAG, approximately 11 parts (SrCa)AlSiN$_3$:Eu, and approximately 72 parts LuAG:Ce by weight is assembled. This mixture is then mixed in a binder of silicone in a proportion in the range of 50-80% by volume of silicone, uniformly applied to output window 108 at a thickness in the range of 90-130 micrometers, and cured. In one example, the mixture is mixed in a binder of silicone in a proportion of approximately 75% by volume, uniformly applied to output window 108 at a thickness of approximately 110 micrometers, and cured.

Figure 7A:
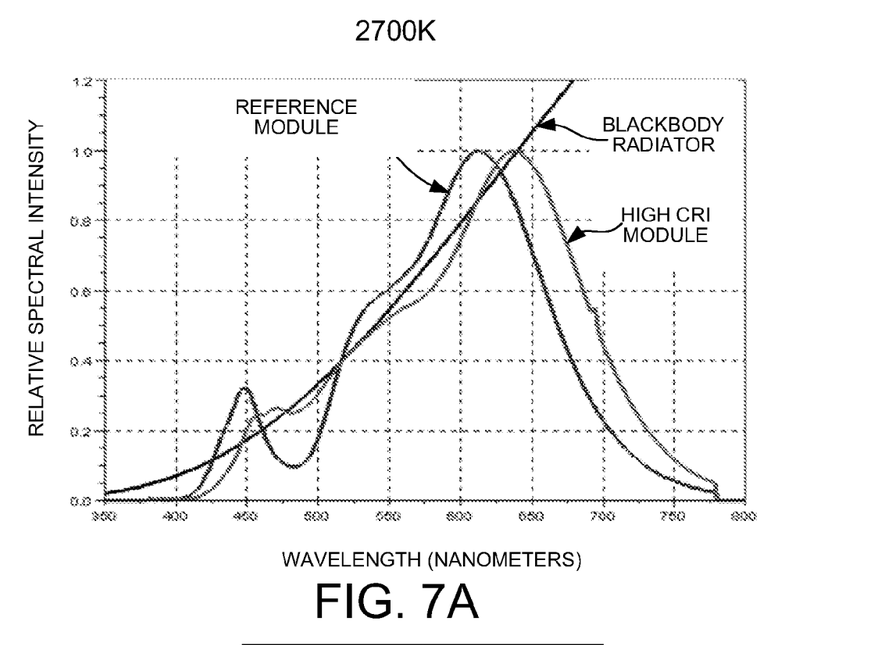
FIG. 7A illustrates the simulated emission spectrum of a blackbody radiator at 2,700 Kelvin and the measured emission spectra of a reference illumination module and a high CRI illumination module.

FIG. 7A illustrates the simulated emission spectrum of a blackbody radiator at 2,700 Kelvin and the measured emission spectra of both the reference illumination module and the high CRI illumination module of this example. In this figure, the emission spectrum of the blackbody radiator has been normalized at 640 nanometers. Comparing the resulting spectra, the spectral response of the high CRI illumination module more closely approximates the blackbody radiator than the reference illumination module in the range of 500 nanometers to 650 nanometers. More specifically, using the following formula $$\max \frac{|\text{Test}(\lambda) - \text{Blackbody}(\lambda)|}{\text{Blackbody}(\lambda)} \Big|_{\lambda=500\,nm}^{\lambda=650\,nm} \quad (2)$$

the reference illumination module has a spectral response that is within 48% of the emission spectrum of a blackbody radiator in the wavelength range between 500 and 650 nanometers, the high CRI illumination module is within 14% of the emission spectrum of a blackbody radiator in the same wavelength range.

Figure 7B:
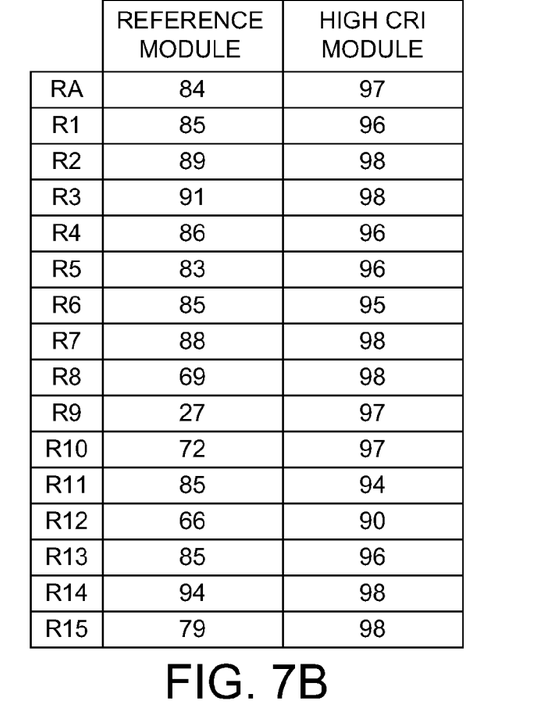
FIG. 7B compares each specific CRI value for the reference and high CRI illumination modules of FIG. 7A.

FIG. 7B compares each specific CRI value for both modules and each CRI value is improved. In particular, R$_9$, which is relevant for color rendering of deep red, is improved from a score of 27 to 97 in this example. In summary, a high CRI illumination module constructed in a manner as discussed above emits light with R$_a$>95, R$_9$>95, average value of CRI values R$_{10}$-R$_{14}$>95, and R$_{15}$>95 for modules with a target CCT of 2,700 Kelvin.

In a second example, the performance of two illumination modules 100 with a target CCT of 3,000 Kelvin are compared. A reference illumination module includes 9 LEDs selected to emit in the royal blue range and one LED selected to emit in the blue range. A red emitting (SrCa)AlSiN$_3$:Eu phosphor with a peak emission at approximately 630 nanometers covers a portion of sidewall insert 107. The phosphor is mixed in a binder of silicone in a proportion in the range of 2-6% by volume, uniformly applied to sidewall insert 107 at a thickness in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a yellow emitting Y$_3$Al$_5$O$_{12}$:Ce phosphor is then mixed in a binder of silicone in a proportion in the range of 50-80% by volume of silicone, uniformly applied to output window 108 at a thickness in the range of 90-130 micrometers, and cured. In one example, the phosphor is mixed in a binder of silicone in a proportion of approximately 70% by volume, uniformly applied to sidewall insert 107 at a thickness of approximately 110 micrometers, and cured. Optionally, some amount of red emitting (SrCa)AlSiN$_3$:Eu phosphor may also be mixed with the yellow emitting Y$_3$Al$_5$O$_{12}$:Ce phosphor.

A high CRI illumination module includes 7 LEDs selected to emit in the royal blue range between 440 and 460 nanometers and three LEDs selected to emit in the blue range between 460 and 490 nanometers. A red emitting (SrCa)AlSiN$_3$:Eu phosphor with a peak emission at approximately 650 nanometers covers a portion of sidewall insert 107. The phosphor is mixed in a binder of silicone in a proportion in the range of 2-6% by volume, uniformly applied to sidewall insert 107 at a thickness of in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a mixture of phosphors in the ranges of approximately 10-25 parts YAG, 5-15 parts (SrCa)AlSiN$_3$:Eu, and 60-80 parts LuAG:Ce by weight is assembled. Environmental conditions and the condition of each phosphor affects the results obtained for any particular combination of phosphors. In one example, a mixture of phosphors including approximately 17 parts YAG, approximately 11 parts (SrCa)AlSiN$_3$:Eu, and approximately 72 parts LuAG:Ce by weight is assembled. This mixture is then mixed in a binder of silicone in a proportion in the range of 50-80% by volume, uniformly applied to output window 108 at a thickness in the range of 90-130 micrometers, and cured. In one example, the mixture is mixed in a binder of silicone in a proportion of approximately 70% by volume, uniformly applied to output window 108 at a thickness of approximately 110 micrometers, and cured.

Figure 8A:
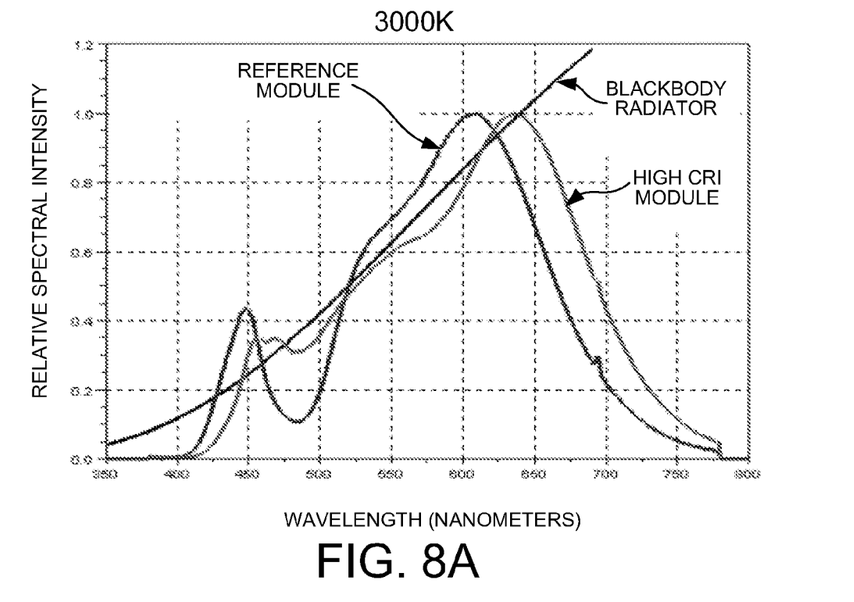
FIG. 8A illustrates the simulated emission spectrum of a blackbody radiator at 3,000 Kelvin and the measured emission spectra of a reference illumination module and a high CRI illumination module.

FIG. 8A illustrates the simulated emission spectrum of a blackbody radiator at 3,000 Kelvin and the measured emission spectra of both the reference illumination module and the high CRI illumination module of this example. In this figure, the emission spectrum of the blackbody radiator has been normalized at 640 nanometers. The spectral response of the high CRI illumination module more closely approximates the blackbody radiator than the reference illumination module in the range of 500 nanometers to 650 nanometers. More specifically, using the formula of equation (2), the reference illumination module has a spectral response that is within 49% of the emission spectrum of a blackbody radiator in the wavelength range between 500 and 650 nanometers, the high CRI illumination module is within 12% of the emission spectrum of a blackbody radiator in the same wavelength range.

Figure 8B:
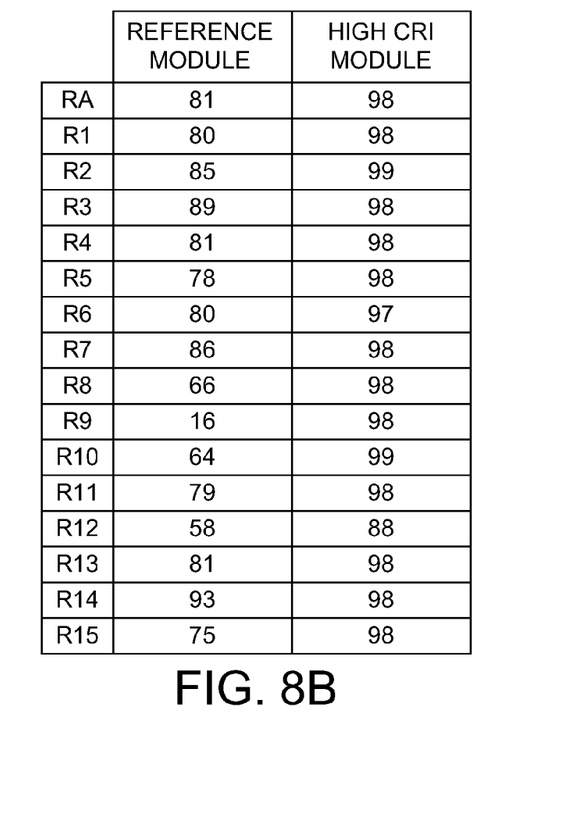
FIG. 8B compares each specific CRI value for the reference and high CRI illumination modules of FIG. 8A.

FIG. 8B compares each specific CRI value for both modules and each CRI value is improved. In particular, $R_9$ is improved from a score of 16 to 98 in this example. In summary, a high CRI illumination module constructed in a manner as discussed above emits light with $R_a$>95, $R_9$>90, average value of CRI values $R_{10}$-$R_{14}$>95, and $R_{15}$>95 for modules with a target CCT of 3,000 Kelvin.

In a third example, the performance of two illumination modules 100 with a target CCT of 4,000 Kelvin are compared. The reference illumination module includes 7 LEDs selected to emit in the royal blue range and three LEDs selected to emit in the blue range. A red emitting (SrCa)AlSiN$_3$:Eu phosphor with a peak emission at approximately 630 nanometers covers a portion of sidewall insert 107. The phosphor is mixed in a binder of silicone in a proportion in the range of 2-6% by volume, uniformly applied to sidewall insert 107 at a thickness in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a yellow emitting $Y_3Al_5O_{12}$:Ce phosphor is then mixed in a binder of silicone in a proportion in the range of 50-80% by volume of silicone, uniformly applied to output window 108 at a thickness in the range of 90-130 micrometers, and cured. In one example, the phosphor is mixed in a binder of silicone in a proportion of approximately 65% by volume, uniformly applied to sidewall insert 107 at a thickness of approximately 110 micrometers, and cured. Optionally, some amount of red emitting (SrCa)AlSiN$_3$:Eu phosphor may also be mixed with the yellow emitting $Y_3Al_5O_{12}$:Ce phosphor.

The high CRI illumination module also includes 7 LEDs selected to emit in the royal blue range and three LEDs selected to emit in the blue range. A red emitting (SrCa)AlSiN$_3$:Eu phosphor with a peak emission at approximately 650 nanometers covers a portion of sidewall insert 107. The phosphor is mixed in a binder of silicone in a proportion in the range of 2-6% by volume, uniformly applied to sidewall insert 107 at a thickness of in the range of 60-120 micrometers, and cured. In one example, the phosphor is mixed in a binder of silicone in a proportion of approximately 4% by volume, uniformly applied to sidewall insert 107 at a thickness of approximately 90 micrometers, and cured. In addition, a mixture of phosphors in the ranges of approximately 10-25 parts YAG, 5-15 parts (SrCa)AlSiN$_3$:Eu, and 60-80 parts LuAG:Ce by weight is assembled. Environmental conditions and the condition of each phosphor affects the results obtained for any particular combination of phosphors. In one example, a mixture of phosphors including approximately 17 parts YAG, approximately 11 parts (SrCa)AlSiN$_3$:Eu, and approximately 72 parts LuAG:Ce by weight is assembled. This mixture is then mixed in a binder of silicone in a proportion in the range of 50-80% by volume, uniformly applied to output window 108 at a thickness in the range of 90-130 micrometers, and cured. In one example, the mixture is mixed in a binder of silicone in a proportion of approximately 70% by volume, uniformly applied to output window 108 at a thickness of approximately 110 micrometers, and cured.

Figure 9A:
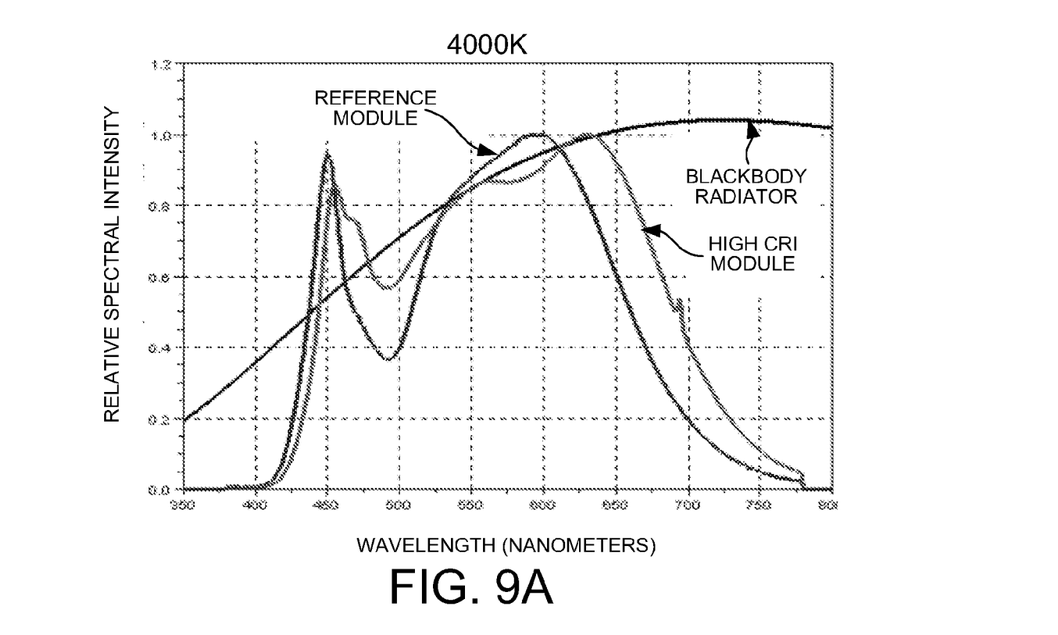
FIG. 9A illustrates the simulated emission spectrum of a blackbody radiator at 4,000 Kelvin and the measured emission spectra of a reference illumination module and a high CRI illumination module.

FIG. 9A illustrates the simulated emission spectrum of a blackbody radiator at 4,000 Kelvin and the measured emission spectra of both the reference illumination module and the high CRI illumination module of this example. In this figure, the emission spectrum of the blackbody radiator has been normalized at 635 nanometers. The spectral response of the high CRI illumination module more closely approximates the blackbody radiator than the reference illumination module in the range of 500 nanometers to 650 nanometers. More specifically, using the formula of equation (2) the reference illumination module has a spectral response that is within 57% of the emission spectrum of a blackbody radiator in the wavelength range between 500 and 650 nanometers, the high CRI illumination module is within 19% of the emission spectrum of a blackbody radiator in the same wavelength range.

Figure 9B:
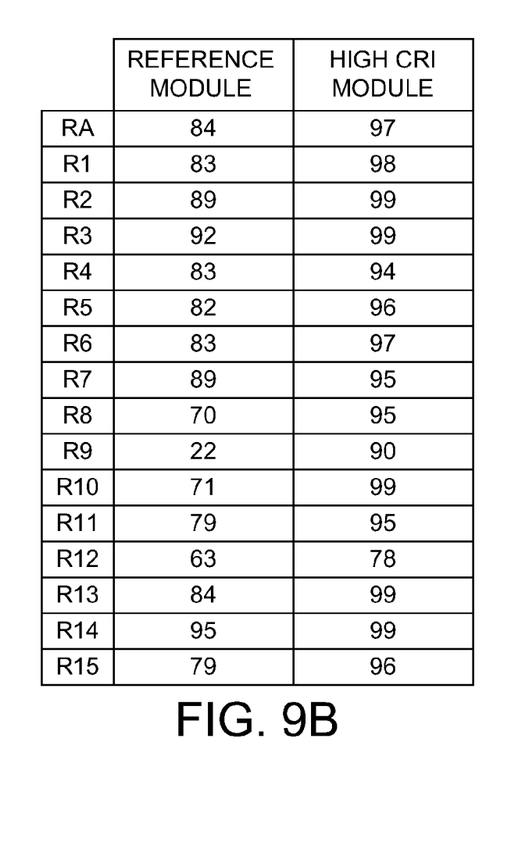
FIG. 9B compares each specific CRI value for the reference and high CRI illumination modules of FIG. 9A.

FIG. 9B compares each specific CRI value for both modules and each CRI value is improved. In particular, $R_9$ is improved from a score of 22 to 90 in this example. In summary, a high CRI illumination module constructed in a manner as discussed above emits light with $R_a$>95, $R_9$>85, average value of CRI values $R_{10}$-$R_{14}$>95, and $R_{15}$>95 for modules with a target CCT of 4,000 Kelvin.

Figure 10:
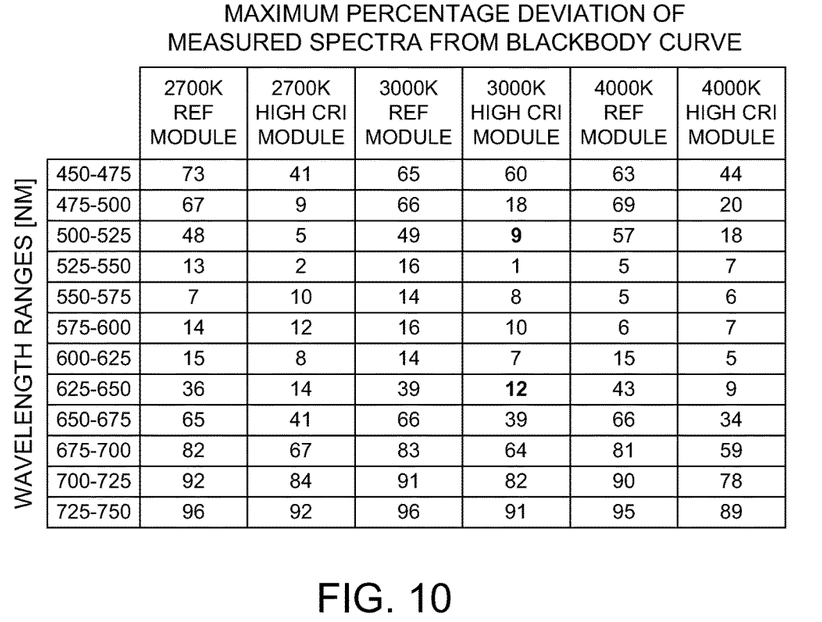
FIG. 10 illustrates the maximum percentage deviation of measured spectra from the blackbody curve for several illumination modules over a set of wavelength ranges.

FIG. 10 summarizes the percentage deviation of the measured spectra of FIGS. 7-9 from each respective blackbody curve over a set of wavelength ranges from 450 to 750 nanometers. Each percentage deviation value is calculated based on the formula of equation (2) evaluated within the corresponding wavelength range of the set of wavelength ranges. For example, the measured spectrum of a high CRI illumination module with a target CCT of 3,000 Kelvin (see FIG. 8) exhibits a maximum percentage deviation from a blackbody curve of 3,000 Kelvin of 9% in the wavelength range of 500-525 nanometers. Furthermore, in the wavelength range of 500-650 nanometers, the maximum percentage deviation is 12% and, as illustrated, this occurs in the wavelength range of 625-650 nanometers.

In another embodiment, an illumination module 100 is realized that achieves a general CRI value, $R_a$, greater than 80 while maintaining a color conversion efficiency ratio greater than 130 lm/W. For purposes of this patent document, a color conversion efficiency ratio is defined as the ratio of the photometric output of an illumination module measured in lumens divided by the radiometric power of the light output of the LEDs measured in watts. This definition of color conversion efficiency focuses on the efficiency of the color conversion process of the illumination module.

In a first example, the performance of two illumination modules 100 with a target CCT of 3,000 Kelvin are compared to illustrate general CRI performance and improved color conversion efficiency. Both the reference illumination module and the high efficiency, high CRI illumination module include 10 LEDs selected to all emit in the royal blue range. Royal blue LEDs are selected because they exhibit higher radiant efficiency than longer wavelength emitting LEDs. Furthermore, the current trend in LED manufacturing is to further improve the radiant efficiency of shorter wavelength LEDs such as those in the wavelength range between 440 and 460 nanometers.

The high efficiency, high CRI illumination module employing three phosphors, includes a red emitting (SrCa)AlSiN$_3$:Eu phosphor with a peak emission at approximately 618 nanometers covering a portion of sidewall insert 107. The phosphor is mixed in a binder of silicone in a proportion in the range of 2-6% by volume, uniformly applied to the sidewall insert 107, and cured. In one example, the phosphor is mixed in a binder of silicone in a proportion of approximately 4% by volume, uniformly applied to the sidewall insert 107, and cured. A mixture of phosphors in the ranges 5-15 parts YAG, 5-15 parts (SrCa)AlSiN$_3$:Eu, and 70-95 parts LuAG by weight is assembled. Environmental conditions and the condition of each phosphor affects the results obtained for any particular combination of phosphors. In one example, a mixture of phosphors including approximately 8 parts YAG, approximately 8 parts (SrCa)AlSiN$_3$:Eu, and approximately 84 parts LuAG by weight is assembled. This mixture is then mixed in a binder of silicone in a proportion in the range of 50-80% by volume of silicone, uniformly applied to output window 108 at a thickness in the range of 90-130 micrometers, and cured. In one example, this mixture is mixed in a binder of silicone in a proportion of approximately 70% by volume, uniformly applied to output window 108 at a thickness of approximately 110 micrometers, and cured. (SrCa)AlSiN$_3$:Eu with a peak emission of approximately 618 nanometers is employed because of its relatively high color conversion efficiency in comparison to red phosphors with higher peak emission wavelengths. The reference illumination module, on the other hand, employing two phosphors, includes a red emitting (SrCa)AlSiN$_3$:Eu phosphor with a peak emission at approximately 630 nanometers covering a portion of sidewall insert 107. The phosphor is mixed in a binder of silicone in a range of 2-6% by volume, uniformly applied to sidewall insert 107, and cured. In one example, the phosphor is mixed in a binder of silicone in a proportion of approximately 4% by volume, uniformly applied to sidewall insert 107, and cured. In addition, a YAG phosphor with a peak emission at approximately 555 nanometers is mixed in a binder of silicone in a range of 50-80% by volume, uniformly applied to output window 108, and cured. In one example, the phosphor is mixed in a binder of silicone in a proportion of approximately 70% by volume of silicone, uniformly applied to output window 108, and cured.

Figure 11:
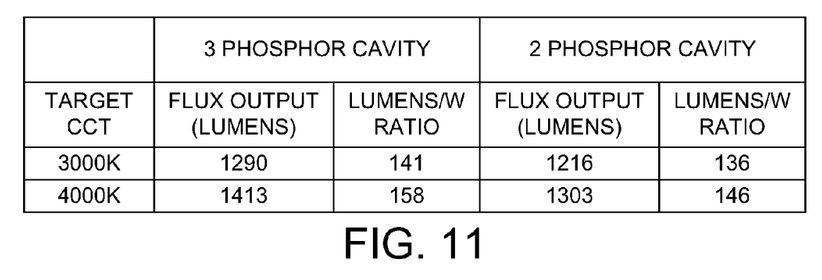
FIG. 11 illustrates improvement in color conversion efficiency and CRI for a high efficiency, high CRI illumination module with three phosphors and a reference illumination module with two phosphors.

FIG. 11 illustrates the improvement in color conversion efficiency and CRI. The two phosphor reference illumination module emits light with a general CRI of 78 and a color conversion efficiency ratio of 136. The three phosphor high efficiency, high CRI illumination module achieves a CRI of 81 and a color conversion efficiency ratio of 141. Similar improvements are illustrated in the comparison of a reference module and high efficiency, high CRI module constructed as discussed above, but with a target CCT of 4,000 Kelvin. In this case, the reference module emits light with a general CRI of 74 and a color conversion efficiency ratio of 146. The high efficiency, high CRI illumination module achieves a CRI of 81 and a color conversion efficiency ratio of 158. Unexpected improvements in both CRI and color conversion efficiency are obtained. These improvements are unexpected because typically the use of a greater number of phosphors in a light mixing cavity creates an increase in reabsorption and associated losses that reduce color conversion efficiency. However, by careful selection of phosphors, their ratios, and their placement in the light mixing cavity as described in this patent document, these losses can be effectively mitigated.

Figure 12A:
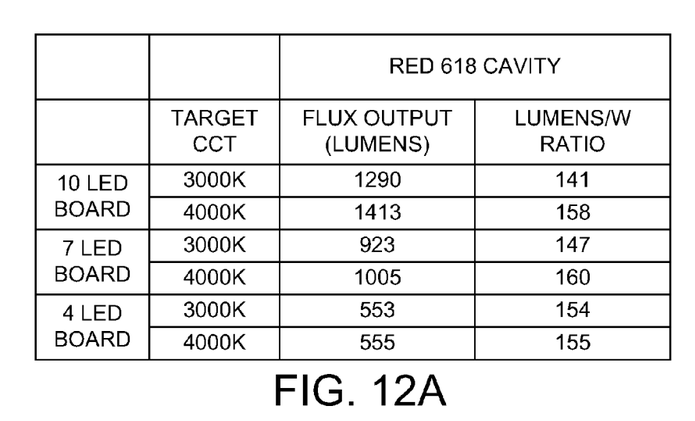
FIG. 12A illustrates the color conversion efficiencies of three groups of high efficiency, high CRI modules at two different target CCTs.

FIG. 12A illustrates the color conversion efficiencies of three groups of two high efficiency, high CRI modules constructed in the manner discussed above. Each group of modules is distinguished by the number of LEDs emitting light into light mixing cavity 109. A first group includes four LEDs, a second group includes seven LEDs, and a third group includes ten LEDs. Within each group one module exhibits a target CRI of 3,000 Kelvin and the other a target CRI of 4,000 Kelvin. Both modules within each group exhibit a general CRI of at least 80. FIG. 12A illustrates that each module is able to achieve a color conversion efficiency ratio greater than 140. Thus, for a range of LEDs emitting light into light mixing cavity 109, similar color conversion efficiencies are obtained.

Figure 12B:
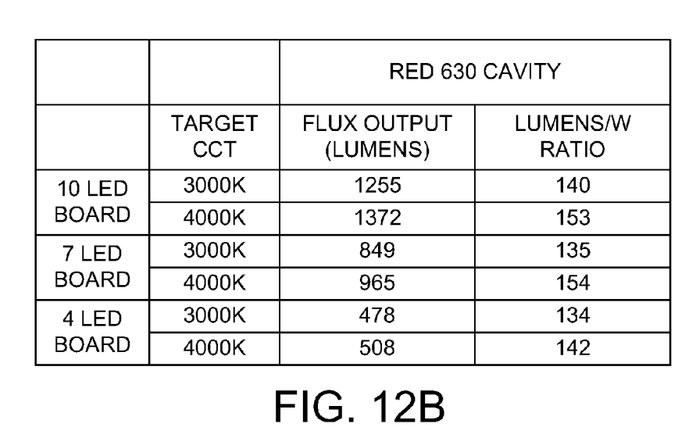
FIG. 12B illustrates the color conversion efficiencies of three other groups of high efficiency, high CRI modules at two different target CCTs.

FIG. 12B illustrates the color conversion efficiencies of three other groups of two high efficiency, high CRI modules. These modules are constructed in the manner discussed with respect to FIG. 12A, however, a portion of the sidewall inserts of these three modules are coated with a red emitting (SrCa)AlSiN$_3$:Eu phosphor with a peak emission at approximately 630 nanometers (Red 630), rather than a red emitting (SrCa)AlSiN$_3$:Eu phosphor with a peak emission at approximately 618 nanometers (Red 618). FIG. 12B illustrates that each module is able to achieve a color conversion efficiency ratio greater than 130. Although the use of Red 630 on the sidewalls rather than Red 618 results in a lower color conversion efficiency ratio, in general, there is also an increase in CRI. In this manner, high efficiency modules can be designed with higher CRI values.

Although certain specific embodiments are described above for instructional purposes, the teachings of this patent document have general applicability and are not limited to the specific embodiments described above. For example, although LEDs 102 are described as LEDs with a peak emission in the UV to blue range, the LEDs 102 can emit different or the same colors, either by direct emission or by phosphor conversion, e.g., where phosphor layers are applied to the LEDs as part of the LED package. Thus, the illumination device 100 may use any combination of colored LEDs 102, such as red, green, blue, amber, or cyan, or the LEDs 102 may all produce the same color light or may all produce white light. In the embodiments described, specific phosphors were described for exemplary purposes, but any number of phosphors each with peak emission in the ranges discussed above may be employed. For example, the phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, SrGa$_2$S4:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)AlSiN$_3$:Eu, CaAlSiN$_3$:Eu. Furthermore, in the embodiments described, specific ratios of phosphors were described for exemplary purposes, but these ratios may be varied to produce similar results. For example, the ratios may be adjusted by 20% and still achieve the color rendering and efficiency performance described in this patent document. In the embodiments described, specific percentages of phosphors combined with silicone binders and film thicknesses were described for exemplary purposes. These percentages and thicknesses may be varied to produce similar results. Accordingly, various modifications, adaptations, and combinations of various features of the described embodiments can be practiced without departing from the scope of the invention as set forth in the claims.

What is claimed is:

1. An apparatus comprising:
   at least one Light Emitting Diode (LED) operable to emit a first colored light; and
   a primary light mixing cavity operable to convert the first colored light to a second colored light, wherein the primary light mixing cavity includes a first photo-luminescent material with a peak emission wavelength between 508 and 528 nanometers and a second photo-luminescent material with a peak emission wavelength between 615 and 655 nanometers, wherein a spectral response of the second colored light is within 20% of a blackbody radiator of the same correlated color temperature for wavelengths between 500 and 650 nanometers.

2. The apparatus of claim 1, wherein the second colored light is emitted from a first wavelength converting material that includes the first photo-luminescent material with the peak emission wavelength between 508 and 525 nanometers and the second photo-luminescent material with the peak emission wavelength between 615 and 655 nanometers.

3. The apparatus of claim 2, wherein the first wavelength converting material includes a third photo-luminescent material with a peak emission wavelength between 545 and 565 nanometers.

4. The apparatus of claim 3, wherein the first photo-luminescent material is a Lutetium Aluminum Garnet doped with Cerium (LuAG:Ce), the third photo-luminescent material is a Yttrium Aluminum Oxide doped with Cerium ($Y_3Al_5O_{12}$:Ce), and the second photo-luminescent material is a (SrCa)$AlSiN_3$:Eu.

5. The apparatus of claim 3, wherein the first photo-luminescent material, the second photo-luminescent material, and the third photo-luminescent material are mixed together in a proportion by weight, and wherein the proportion is between 55 and 90 parts of the first photo-luminescent material, between 5 and 35 parts of the third photo-luminescent material, and between 5 and 25 parts of the second photo-luminescent material.

6. The apparatus of claim 2, wherein the second colored light emitted has a color rendering index value, Ra, of 80 or greater.

7. The apparatus of claim 2, wherein the second colored light has a color rendering index (CRI) value, $R_9$, greater than 85.

8. An apparatus, comprising:
   at least one Light Emitting Diode (LED) operable to emit a first colored light; and
   a primary light mixing cavity operable to convert the first colored light to a second colored light, the primary light mixing cavity comprising a first, second, and third photo-luminescent material, wherein a peak emission wavelength of each of the first, second, and third photo-luminescent materials is at least thirty five nanometers from the peak emission wavelengths of the other photo-luminescent materials and no more than one hundred and fifty nanometers from the peak emission wavelengths of the other photo-luminescent materials.

9. The apparatus of claim 8, wherein the first photo-luminescent material has a peak emission wavelength between 508 and 528 nanometers and the second photo-luminescent material has a peak emission wavelength between 615 and 655 nanometers.

10. The apparatus of claim 9, wherein the third photo-luminescent material has a peak emission wavelength between 545 and 565 nanometers.

11. The apparatus of claim 10, wherein the first, second, and third photo-luminescent materials are mixed together in a proportion by weight, wherein the proportion is between 55 and 90 parts of the first material, between 5 and 25 parts of the second material, and between 5 and 35 parts of the third material.

12. The apparatus of claim 10, wherein the first material is a Lutetium Aluminum Garnet doped with Cerium (LuAG:Ce), the second material is a (SrCa)$AlSiN_3$:Eu, and the third material is a Yttrium Aluminum Oxide doped with Cerium ($Y_3Al_5O_{12}$:Ce).

13. The apparatus of claim 8, wherein a spectral response of the second colored light is within 20% of a blackbody radiator of the same correlated color temperature for wavelengths between 500 and 650 nanometers.

14. The apparatus of claim 8, wherein the second colored light has a general color rendering index (CRI) value greater than 80.

15. The apparatus of claim 8, wherein the second colored light has a color rendering index (CRI) value, $R_9$, greater than 85.

16. An apparatus, comprising:
   at least one Light Emitting Diode (LED) operable to emit a first colored light, and
   a primary light mixing cavity operable to convert the first colored light to a second colored light, wherein a spectral response of the second colored light is within 20% of a blackbody radiator of the same correlated color temperature for wavelengths between 500 and 650 nanometers, the primary light mixing cavity comprising a first wavelength converting material that includes a first and second photo-luminescent material, wherein the first photo-luminescent material has a peak emission wavelength between 508 and 528 nanometers, and the second photo-luminescent material has a peak emission wavelength between 615 and 655 nanometers.

17. The apparatus of claim 16, further comprising:
   a third photo-luminescent material having a peak emission wavelength between 545 and 565 nanometers.

18. The apparatus of claim 17, wherein the first wavelength converting material comprises the first, second, and third photo-luminescent materials.

* * * * *

UNITED STATES PATENT AND TRADEMARK OFFICE
CERTIFICATE OF CORRECTION

| | |
|---|---|
| PATENT NO. | : 9,835,295 B2 |
| APPLICATION NO. | : 14/752686 |
| DATED | : December 5, 2017 |
| INVENTOR(S) | : Gerard Harbers and Raghuram L. V. Petluri |

Page 1 of 1

It is certified that error appears in the above-identified patent and that said Letters Patent is hereby corrected as shown below:

In the Claims

Column 13, Line 22, Claim 2, replace "508 and 525" with --508 and 528--.

Signed and Sealed this
Third Day of December, 2019

Andrei Iancu
*Director of the United States Patent and Trademark Office*